United States Patent [19]

Nelson et al.

[11] Patent Number: 4,669,880

[45] Date of Patent: Jun. 2, 1987

[54] APPARATUS FOR CONVERTING THE WAVELENGTH RESOLUTION OF A SPECTROPHOTOMETER

[75] Inventors: Michael R. Nelson, Downers Grove, Ill.; Jerry E. Cahill, Trumbull, Conn.

[73] Assignee: The Perkin-Elmer Corporation, Norwalk, Conn.

[21] Appl. No.: 704,357

[22] Filed: Feb. 21, 1985

[51] Int. Cl.[4] ............................. G01J 3/28; G01J 3/06
[52] U.S. Cl. ................................... 356/326; 356/332; 364/526
[58] Field of Search ............... 356/308, 319, 326, 328, 356/329, 332; 364/498, 525, 526

[56] References Cited

U.S. PATENT DOCUMENTS 4,557,601 12/1985 Kuroishi et al. ................ 356/326 X

FOREIGN PATENT DOCUMENTS 458840 3/1975 U.S.S.R. ............................. 364/498

OTHER PUBLICATIONS

Blout et al., "Infra-Red Microspectroscopy" Josa, vol. 40 #5, May 1950, pp. 304-312.

Primary Examiner—Vincent P. McGraw
Attorney, Agent, or Firm—Ronald G. Cummings; Francis L. Masselle; Edwin T. Grimes

[57] ABSTRACT

Output data from a spectrophotometer may be presented as a series of data values representative of the intensity amplitude of pass bands having equal bandwidths (resolution) and spaced at wavelength intervals equal to the bandwidth. For some purposes it is desirable to increase the bandwidth of said data, and this invention discloses method and apparatus for converting such data to equivalent data having a selected greater bandwidth.

11 Claims, 3 Drawing Figures

APPARATUS FOR CONVERTING THE WAVELENGTH RESOLUTION OF A SPECTROPHOTOMETER

FIELD OF INVENTION

This invention relates to spectrophotometry, and more particularly, to a system for data acquisition and subsequent conversion of spectral bandwidth, especially when using a photodiode array as the measuring photometric device.

This application is related to the commonly assigned Nelson et al. U.S. patent application, Ser. No. 704,356, filed Feb. 21, 1985 for "Automatic Digital Wavelength Calibration System For Spectrophotometer" which is incorporated herein by reference in its entirety.

BACKGROUND OF THE INVENTION

While the term "wavelength resolution" as applied to a spectrophotometer properly means the smallest increment of wavelength that can be distinguished by the photometric detection system, the term is also commonly used in the field as a synonym for the half bandwidth, often just called "bandwidth", of the instrument. In this disclosure the latter usage will be understood as synonymous with "resolution".

As is well known in the art, wavelength resolution, hereinafter simply called "resolution", is a function of the spectrophotometer determined by the parameters of the monochromator such as physical dimensions, number of lines/mm of the grating, and width of the entrance and exit slits. Other than for multigrating spectrophotometers where gratings of different grooves per millimeter may be interchanged, the resolution can normally be varied only by changing the slit width. Variable width slits, however, are expensive and liable to reproducibility errors since the mechanism required for such a slit must be extremely precise to establish widths of a few micrometers reproducibly. In the case of a monochromator where the photometric device is a photodiode array which takes the place of the exit slit the width of an individual element, or "pixel", of the array may typically be 25 μm. Since each pixel functions as an exit slit for a specific wavelength band the slit width will be normally 25 μm for both exit and entrance slits.

In this invention disclosure the spectrophotometer cited as an example is a scanning spectrophotometer using a photodiode array (PDA) as a photometric detector. While this invention is well suited for providing resolution conversion in conjunction with such a spectrophotometer, it should be also made clear that the invention, with suitable modification, can also be used to advantage with other types of spectrophotometers having fixed entrance and exit slits operated in scanning modes.

It is an object of this invention to provide computer programmed means for establishing a multiplicity of operating bandwidths (resolutions) for an associated spectrophotometer.

It is an object of this invention to be able to operate a spectrophotometer at a plurality of selected resolutions without the use of variable slits.

It is also an object of this invention to be able to use a photodiode array as a photometric receiver in a spectrophotometer while retaining the ability to operate at any of several resolution values.

It is a further object of this invention that digitally computed data output values shall, irrespective of the resolution selected, substantially agree with such values obtainable by physical change of slit width.

It is yet a further object of this invention that the resolution conversion program may be run on an auxiliary data handling computer peripheral to the spectrophotometer.

BRIEF DESCRIPTION OF THE INVENTION

One function of a spectrophotometer is to present photometric data, usually in graphic form, which shows the wavelength location and shape of absorption bands specific to constituents of analytical samples. This function is best accomplished when the initial basic band pass of the spectrophotometer is narrow (high resolution) and the shape of the intensity envelope of the pass band is triangular. The triangular shape is normal when the spectrophotometer's entrance and exit slits are of equal width. Under this condition the initial basic half band width is equal to the dispersion in the slit plant multiplied by the slit width.

It is not always desirable to use the narrowest resolution the spectrophotometer is capable of. Older instruments in the field were not able to attain the high resolution possible with recent equipment, yet many of the published spectral curves were obtained with the older instruments and still present currently used data values. In some cases, furthermore, resolution of close doublets or multiplets in an absorption curve is not wanted. These and other analytical requirements make it desirable to have the choice of several graduated wider resolution values for a spectrophotometer. The subject invention makes this possible through digital means.

The basic display generated by a spectrophotometer scan is a curve comprising a series of consecutive wavelength intervals as abscissa, each interval having associated therewith an intensity ordinate. In the exemplary case the initial basic wavelength intervals are determined by the spacing between pixels of the PDA and the intensity ordinates are the data points generated by the pixels. It will be readily understood that other similar spectrophotometer scan curves could be divided into wavelength segments and corresponding ordinate values.

In the exemplary case the narrowest resolution (minimum bandwidth) is the initial basic resolution and is provided where the entrance slit width and the pixel intervals are equal, with one data ordinate displayed per pixel. To convert the bandwidth to r times the initial basic bandwidth, the computer is programmed by this invention to add to the original data value a fractional or loaded part of the data values of 2r lateral pixels, half on either side of the central wavelength pixel. This must not be done as a simple sum of $2r+1$ values, or the result would not be equivalent to a triangular pass band of r times the basic bandwidth. A simple sum would be equivalent to opening only a variable exit slit to r times the basic width without changing the entrance slit. The result would be a trapezoidal pass band. This invention overcomes the above difficulty and gives results equivalent to those obtained by opening both slits equally.

The retention of the proper triangular pass band shape is effected in this invention by a summation equation devised to load the central element ordinate more than the lateral elements on either side of the center. The more remote a side element is from the center the less its weight in the summation. By this loading procedure the computed pass band will deliver the same data result as if the data had originated from a spectrophotometer both of whose slits were equally mechanically opened to the width of the r times pass band.

It can be seen from the brief outline above that the selection of a desired resolution value is effected by the selection of "r" to be used in a computer program which works on the data output of the photometric system of the spectrophotometer. This invention thus eliminates the requirement for a mechanical adjustment of the spectrophotometer slits. The system may also be applied to scanned sets of data from other spectrophotometers and is not restricted to an array spectrophotometer. This invention is also effective on both transmittance and absorbance data, derivative data and other types of similarly presented data.

There has thus been outlined rather broadly the more important features of the invention in order that the detailed description thereof that follows may be better understood, and in order that the present contribution to the art may be better appreciated. There are, of course, be additional features of the invention that will be described more fully hereinafter. Those skilled in the art will appreciate that the conception on which this disclosure is based may readily be utilized as the basis of other methods and apparatus for carrying out the various purposes of the invention. It is important, therefore, that this disclosure be regarded as including such equivalent methods and apparatus as do not depart from the spirit and scope of the invention.

One embodiment of the invention has been chosen for purpose of illustration and description, and is shown in the accompanying drawings forming a part of the specification.

DETAILED DESCRIPTION OF A PRESENTLY PREFERRED EMBODIMENT OF THE INVENTION

Figure 1:
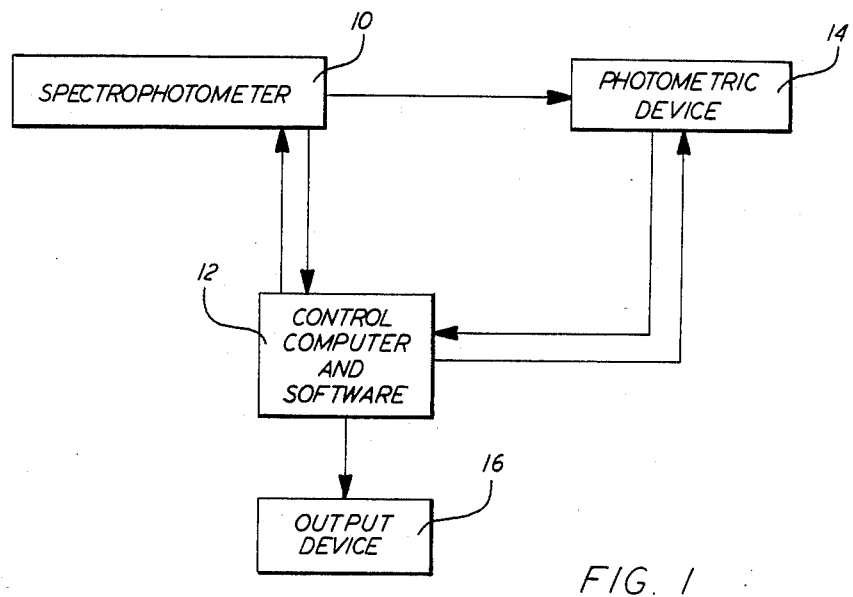
FIG. 1 is a block diagram of apparatus for converting wavelength resolution of a spectrophotometer.
Figure 2:
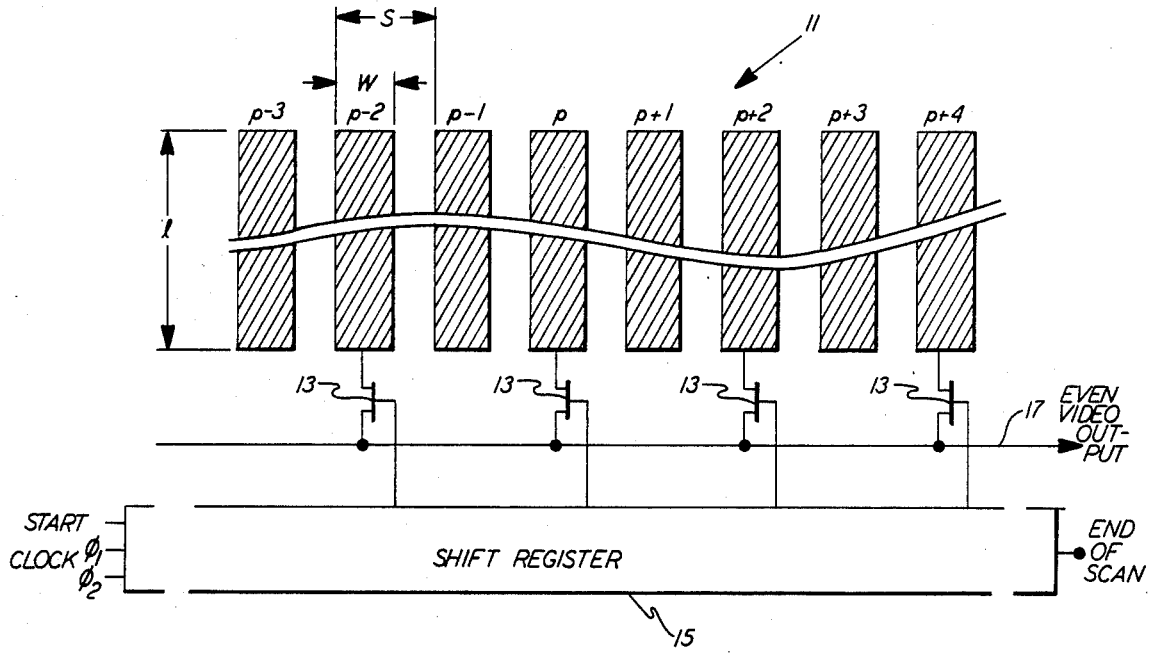
FIG. 2 shows a simplified schematic diagram of a photodiode array (PDA)

In the presently preferred embodiment considered herein from exemplification of the invention, the data output from a spectrophotometer 10, FIG. 1, is delivered to a computer 12 from a photometric device 14, which in the illustrated embodiment is in the form of a photodiode array (PDA), as seen in FIG. 2. The computer has output means indicated at 16, which can be in the form of a chart recorder and/or a visual display screen. The nature of the data, where bandwidth or resolution is to be determined by the computer, will be clarified by reference to FIG. 2 which shows a simplified diagram of the PDA. The PDA presents to the dispersed beam from the monochromator of the spectrophotometer a photoreceptor array comprising a series of photosensitive elements or elementary barrier-layer photovoltaic cells indicated at 11 disposed parallel to one another as shown in FIG. 2. A typical PDA, as used in this embodiment, is Reticon RL512S. In this PDA 512 elements are located on a single silicon chip a little over 13 mm long. The spacing "s" between elements is 25 $\mu$m and the length "l" of each element is 2.5 mm. Incorporated on the same chip are a series of digital switches 13 in two sets (one only shown) controlling alternate elements or "pixels" (picture elements). A shift register 15 driven from the computer clock system causes the charges on the pixels to be sequentially scanned and delivered to the computer through the video output line 17 and its counterpart for the odd pixels. The use of a dual, alternately phased, output system permits balancing out dark current from the PDA.

The face of the chip on which the pixel array is deposited is mounted in the plane of the monochromator where the exit slit image is formed. Consequently each pixel delivers a photometric response whose intensity is that of a small segment of the total wavelength extension of the dispersed spectrum. Scanning the array therefore gives a sequence of data points which can be displayed as ordinates of a conventional spectral distribution curve of intensity vs wavelength as abscissa. The initial basic resolution, i.e. bandwidth, is fixed by the width "w" of a pixel (which for practical purposes may be considered effectively equal to "s") times the linear dispersion in the exit slit plane, and by the width of the entrance slit of the monochromator which would normally be the same as that of the pixel, i.e. "w" (or "s"). For the embodiment being considered the resolution is typically 0.25 nm. To change this resolution in the traditional manner to other values, say to 0.5 nm, 1.0 nm, or other larger values, would require costly mechanical and optical complication of a very precise nature.

As has been stated, this invention discloses how such additional values of resolution can be provided for the data by digital computational means without alteration of the PDA or the monochromator.

Figure 3:
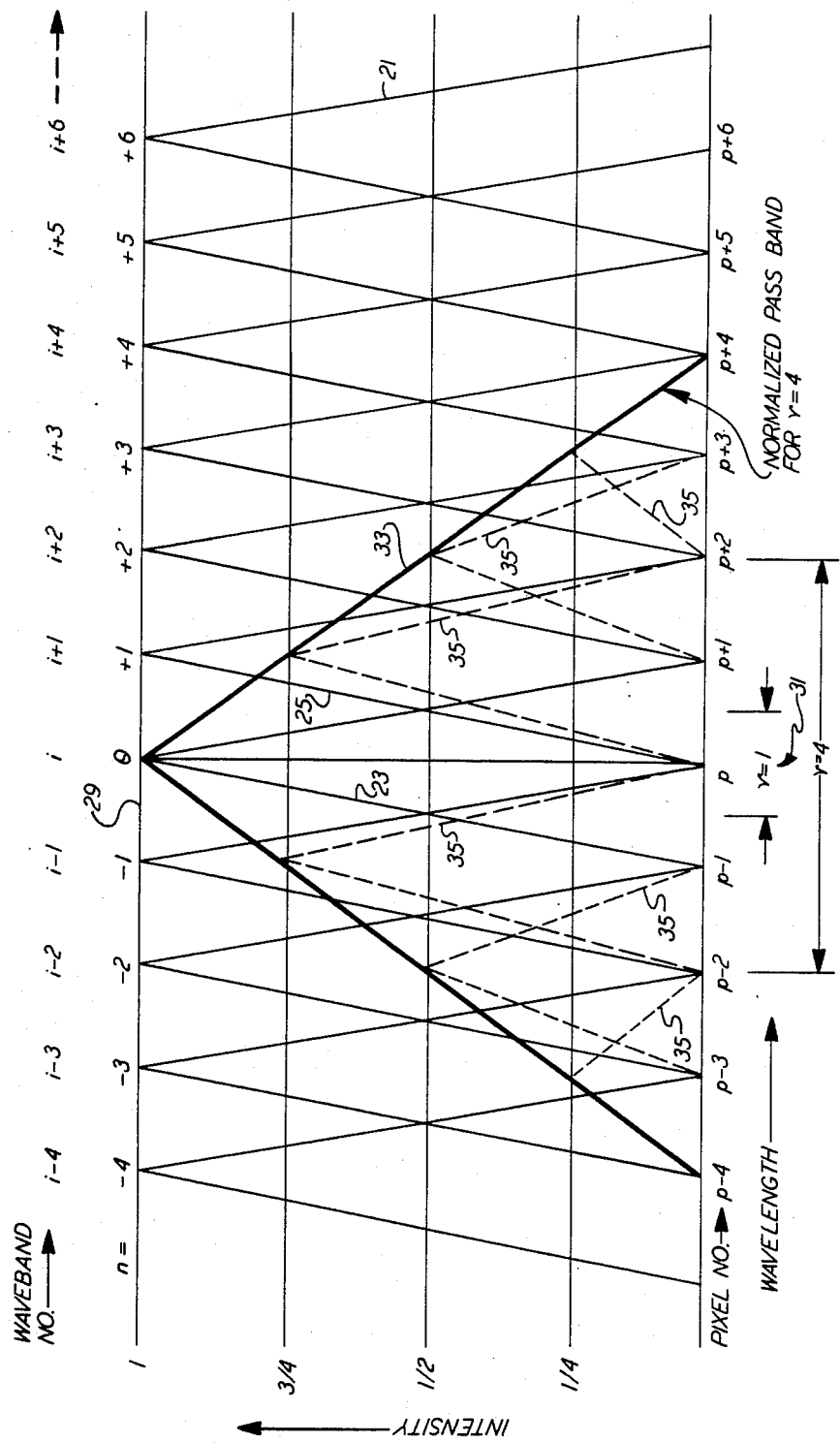
FIG. 3 shows a diagram illustrating resolution change applied to a constant intensity data sequence.

Referring to FIG. 3 a diagram of a data sequence is shown. This sequence is a part of a simple scan of the PDA output. On this diagram may be seen a series of triangular pass bands, 21, each from a separate pixel, eg. (p−1, 0, p+1), 23, originating from pixel p; (p, +1, p+2), 25, originating from pixel p; p+1; etc. These triangular pass bands may be identified by their vertex "n" numbers in reference to the center band "0" as 0, +1, +2, etc. and −1, −2, etc. They may also be identified independently by the subscripts i, i+1, i+2, etc. On the diagram the vertex height as indicated at 29 represents the intensity $I_n$ and, for simplicity in the diagram, an equal intensity vs wavelength curve is assumed. The base of each triangular pass band is 2r, where r is the half bandwidth 31 or resolution, ie. the width of the triangular pass band at half altitude. The readout display will show the vertex points only as a horizontal line at ordinate 1 versus wavelength as abscissa corresponding to the value of the p number.

In order to cover the whole wavelength range at r times the basic resolution a summation will be applied to each data point on the basic resolution curve. The complete summation includes the central value, the weighted summation of r points below the central value plus the weighted summation of r points above the central value. This summation is thus performed on the weighted subset of data values centered on each of the original data points. If instead of the initial basic resolution r=1, a curve is desired built up of triangular pass bands of resolution r=4, this curve must be generated by combining the series of pass bands with vertices at wavelengths p−2, p−1, p, p+1, p+2, etc. For simplicity only one of these subsets or sequences of pass bands is shown in FIG. 3, ie. (p−4, 0, p+4). The broader pass band 33 can be derived, as is hereinafter shown, by computer combination of the pass band at p (ie, n=0) with weighted portions of the pass bands at n=−3, −2, −1 and +1, +2 +3. These weighted pass bands 35 are shown in FIG. 3 by broken lines. The extreme members of the subset, n=−4 and +4 are reduced to zero by the procedure. It can be shown that the following expression holds for the computation required:

$$I_o' = \frac{\sum_{n=-r}^{n} I_n * (r - |n|)}{N} \quad (1)$$

where:
- $I_o'$ is the normalized intensity of the desired waveband having the resolution r;
- $I_n$ is the intensity of the n-th waveband, (all equal to $I_o$ in this example);
- $|n|$ is the absolute value of n, ie +n and −n are both equal to n;
- r is the selected resolution, (4 in this example);
- N is a normalizing factor to make $I_o'=I_o$ for scaling purposes.

The factor $(r-|n|)$ is the weighting factor which loads by reducing the contribution of the side bands as $|n|$ increases. By summing the expression it can be shown that $N=r^2$.

There are a number of ways by which a computer can execute the mathematical procedure indicated in equation (1) above and extend it to cover the whole wavelength range. These may include short cuts by which the computation can be speeded up in practice. It is deemed that these are properly specific programming procedures amounting to equivalent ways of practicing the invention. Hence this disclosure, while setting forth exemplary procedural steps, does not give detailed program code for any particular computer routine as this is optional to one skilled in the computer art.

To illustrate how the invention is practiced the following discussion will refer to the generation of a spectral transmittance curve by the exemplary PDA scanning spectrophotometer. The following procedure steps are typical 1. With the light beam blocked a scan is run to generate a set of data points for zero background vs wavelength. These are stored by the computer.
2. With a clear beam or a reference sample in the beam a scan is run to generate a set of data points for the 100% transmittance line. The computer subtracts corresponding zero background points from step 1 and stores the corrected set of reference data points.
3. With the sample to be measured in the beam, a scan is run to generate a set of sample data points. The computer subtracts from these the corresponding zero background points from step 1. The sample data points are then divided by the corresponding reference data points to give a set of percent Transmittance (%T) data points vs wavelength having the basic resolution of r=1. The %T points are stored.
4. The selected final resolution is keyed into the computer. In FIG. 3, for example, r=4.
5. The computer computes the new value of intensity of the first %T data point, $I_i'$, where i is the number of the data point in the series vs wavelength.

Equation (1), previously stated, may be rewritten in this more general form:

$$I_i' = \frac{1}{r^2} \sum_{n=i-r}^{i+r} I_n * (r - |n - i|) \quad (2)$$

where $I_n$ is the %T value for each pass band data point from i−r through i to i+r. The expression therefore computes the summation of the central pass band $I_i$ plus the weighted sums of r−1 pass bands on either side of the central band (see FIG. 3). The new value $I_i'$ of %T has the selected resolution and is stored for future display.

6. The computer then proceeds to the next data point to be computed: $I_i'+1$. This could be computed in the same way as $I_i'$ by dropping the left pass band of the subset and adding the next right pass band (FIG. 3) and recomputing with each value of $I_n$ shifted to that of the next data point to the right. However, a short cut to speed up the computation may be made. It can be shown that:

$$I_{i+1}' = I_i' + (-I_{i+1}^- + I_{i+1}^+) \quad (3)$$

where $$I_{i+1}^- = I_i^- - I_{i-r} + I_i$$

$$I_{i+1}^+ = I_i^+ - I_i + I_{i+r}$$

and $$I_i^- = \sum_{n=i-r}^{i-1} I_n \qquad I_i^+ = \sum_{n=1}^{i+r-1} I_n$$

By programming the expression (3) into the computer the operations are reduced to simple sums which saves computer time.

7. By repeating the foregoing the computer generates the data point set for the altered resolution preselected and stores or outputs this set vs wavelength for display or other use.

Since the total summation includes points both above and below the central wavelength point it is necessary to supply a set of unread points at each end of the wavelength range or else r−1 points at each end of the wavelength would have to be excluded. These extra points may be developed by averaging adjacent points on the other side of the central point, the "mirror image" points, and using the averaged "pseudo" points to replace the missing points. After the foregoing procedure for the first point on the range using pseudo points the computer will compute the second point as a second summation dropping off one (pseudo) point below and adding one point above in computing the weighted summations. This procedure is repeated in a similar manner to the last value at the top of the wavelength range with the averaged pseudo points used in the last r summations.

As has been mentioned, the first several recomputed data points, and also the last several, may required as an approximation the use of "pseudo" data points corresponding to pass bands for which no pixel on the array exists. As an alternative, to avoid excessive distortion of the ends of the curve, these points may be supplied to the computer by instructing the computer to average the last four values of the existing data points at their original resolution. Other ways of handling this requirement can also be suggested by one skilled in the art.

Although a certain particular embodiment of the invention has been herein disclosed for purposes of explanation, various modifications thereof, after study of the specification, will be apparent to those skilled in the art to which the invention pertains, and reference should accordingly be had to the appended claims in determining the scope of the invention.

What is claimed is:

1. Apparatus for converting the wavelength resolution of a scanning spectrophotometer comprising, in combination:

a photometric device for receiving a dispersed beam outputted from said spectrophotometer and outputting a series of data points;

means responsive to the output of said photometric device for generating a data set derived from a series of spectral pass bands presented in order of central wavelength values;

means for processing said data by summing the components of individual subsets of said data in sequence in such a manner that each summation provides a new data value having an intensity of response equivalent to that of a pass band of a preselected resolution centered at the central wavelength of said subset; and means for producing an output curve corresponding to said new data values.

2. Apparatus according to claim 1 wherein said photometric device comprises a photodiode array.

3. Apparatus according to claim 2 wherein said photodiode array comprises a plurality of pixels disposed parallel to one another, a series of digital switches in two sets for controlling alternate pixels, a shift register driven by clock means for causing the charges on the pixels to be sequentially scanned and delivered to said means for generating a data set.

4. The system according to claim 1 wherein said pass bands have intensity of response envelopes substantially triangular in shape.

5. The system according to claim 1 wherein said pass bands all possess bandwidths of the same initial magnitude.

6. The system according to claim 1 wherein said pass bands are each identifiable by ordinal number.

7. A method for converting the wavelength resolution of a scanning spectrophotometer comprising, in combination:

receiving a dispersed beam outputted from said spectrophotometer and outputting a series of data points;

generating responsive to the output of said photometric device a data set derived from a series of spectral pass bands presented in order of central wavelength values;

processing said data by summing the components of individual subsets of said data in sequence in such a manner that each summation provides a new data value having an intensity of response equivalent to that of a pass band of a preselected resolution centered at the central wavelength of said subset; and producing an output curve corresponding to said new data values.

8. A method of converting spectrophotometer data pass bands from initial basic bandwidths to selected wider bandwidths comprising, in combination:

generating a series of data points representing the ordinate values of successive pass bands having an initial bandwidth vs wavelength as abscissa;

establishing ordinal and amplitude identification from said series of a set of lateral data points on each side of a central data point;

weighting the value of each said lateral data points by multiplication by a loading factor which decreases as the ordinal separation of each said lateral points from the central point increases; and summing the value of said central data point with the values of said loaded lateral data points.

9. The method of converting spectrophotometer data of claim 8 wherein said set of lateral data points comprises r points on each side of said central data point where r is the factor by which the initial basic bandwidth is to be increased.

10. The method of converting spectrophotometer data of claim 8 wherein said loading factor is proportional to $r-n$ where n is the ordinal number of said lateral data point counted in integral steps from the central data point.

11. The method of converting spectrophotometer data of claim 8 wherein said summation is divided by $r^2$ to restore the amplitude level to that of said pass band having an initial basic bandwidth.

* * * * *